Dec. 23, 1941. C. G. HAWLEY 2,267,608
SEWAGE SEDIMENTATION SYSTEM
Filed Oct. 18, 1938
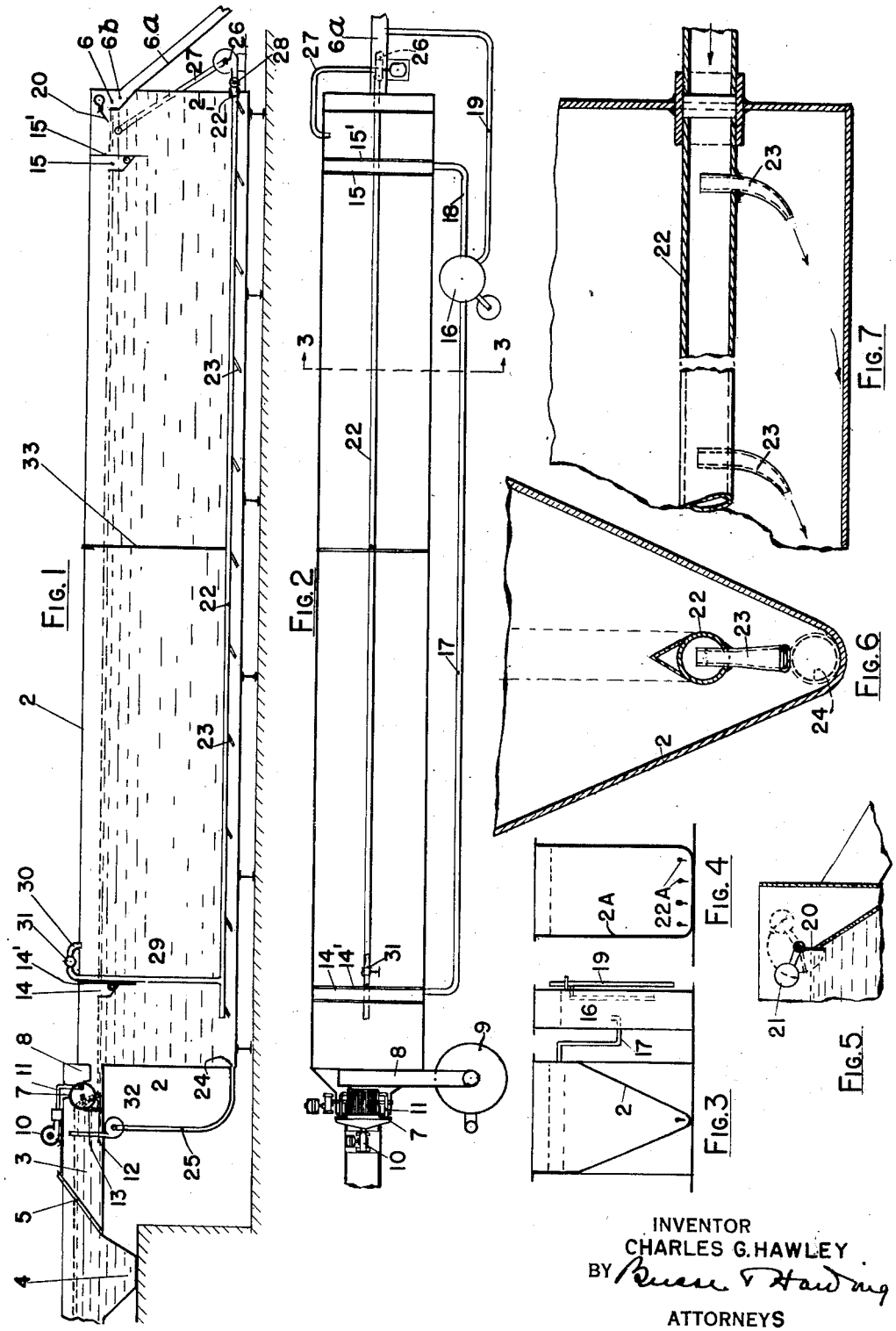
INVENTOR
CHARLES G. HAWLEY
BY
ATTORNEYS Patented Dec. 23, 1941

2,267,608

UNITED STATES PATENT OFFICE 2,267,608

SEWAGE SEDIMENTATION SYSTEM

Charles Gilbert Hawley, Cleveland, Ohio; Hope Hawley Degenhardt and Virginia Taylor Hawley, executrices of Charles Gilbert Hawley, deceased, assignors, by mesne assignments, to Hawley Engineering Corporation, Cleveland, Ohio, a corporation of Ohio Application October 18, 1938, Serial No. 235,628

7 Claims. (Cl. 210—3)

This invention relates to improvements in the sedimentary treatment of sewage.

Sewage is polluted water and always is to be considered as a flowing stream which must be discharged into a larger body or stream of diluting water. To limit the pollution of the latter, steps are taken to purify the sewage; that is, to remove putrefiable organic matters, before dilution occurs.

The present invention is concerned with the purification of sewage by sedimentation and is further concerned with the disposal or destruction of the matters which by that process are separated from the sewage, in advance of dilution.

Sedimentation in itself is a simple matter of reducing or slowing down the movement of the stream to an extent that permits quiet precipitation of sewage matters that are heavier than the liquid and the levitation or rise of matters which are lighter than that liquid. Then, it becomes necessary to remove and dispose of the gravitationally separated matters.

The slowing down of the stream is referred to as detention; and is performed in a pond-like tank. The process is continuous and not to be interrupted, which means that the separated matters must be removed while the stream continues to flow.

Scum, which floats upon the water in the tank, is visible, within easy reach and not difficult to remove with a small quantity of purified sewage. But thereafter the mixed scum and water must be separately disposed of. Means are herein provided for such removal, separation and final disposition. As a rule oils and greases may be refined for after use or in crude state may be burned along with the solids taken from the flowing sewage, as hereinafter described.

The particles which settle to the bottom of the tank are not great in quantity but, containing much organic matter, tend to decompose rapidly and unless promptly removed seriously re-contaminate the slowly moving sewage, which obviously should be avoided.

Next to be considered is the fact that such matters, commonly called settleable solids, are little heavier than water and once they have settled upon the tank bottom cannot be disturbed or stirred without further re-contaminating the sewage.

Therefore, such solids cannot be withdrawn in bulk but must be very gently moved toward a point of discharge from the tank and, then, can be discharged only with an accompanying flow of water. That water, heavily polluted, is commonly called "sludge" and remains to be disposed of; which means that the water and solids must be separated and both cared for in manner to obviate nuisances and danger to health.

The primary objects of the invention will be understood from the foregoing. Other objects attend the accomplishment thereof and will be set forth in further detail.

As explained, the invention has to do with the sedimentation of sewage and in carrying out this invention I first prepare the sewage, for sedimentation. Many advantages flow from so doing.

Preparation hereunder consists in mechanically removing from the influent sewage all matters which might burden subsequent operations in the tank and interfere with the continuity of sludge removal. A fine screen is here employed for the purpose in advance of the sedimentation tank and the total of solids which enter the tank is thereby reduced and limited to minute particles of approximately uniform size. In consequence, less sludge is found at the bottom of the tank and that sludge may be discharged from the tank through a small duct or pipe, which last is another way of saying that in comparison with former practices the bulk of watery sludge is much reduced and less water is presented for ultimate separation from the sludge solids. Clogging of pipes is completely avoided, for, in the manner described, coarse and stringy objects are excluded from the tank.

The fine screen referred to is preferably of the type described in my companion application entitled "Rotary screen," S. N. 235,627 filed October 18, 1938, and not only intercepts bulky matters, strings, sticks and straws but also a large proportion of all finer sewage solids.

The screening operation is continuous and the face of the screen is constantly covered by a mass or layer of sewage matters through which the liquid must pass and which improve or refine that filtering operation. Thus a further limitation is imposed upon the number and size of the settleable solids finally delivered to the tank.

As a distinct step in the purification process considered as a whole, the sludge taken from the bottom of the tank through the pipe or duct referred to, is discharged directly into the influent sewage stream, in advance of the described screen or filter. In consequence, most of the returned sewage solids, though fine, are caught upon the matted screen, while the sludge water returns to the tank for further treatment.

Hereunder, a pump is employed to withdraw sludge from the tank and deliver it in advance of the screen, but otherwise separation of the sludge solids and water is automatically accomplished without added equipment. As will be apparent, no close regulation of sludge is now required for, whatever the volume, it is automatically cared for.

The screen is of a sort to serve as a dryer for the intercepted solids and with very little water they are continuously removed from the screen and thereafter are burned, combustion being regarded as the best method of final disposition.

This process of preparing sewage for sedimentation and which provides for the actual destruction of separated matters has many advantages. Sewage solids which should never be allowed to enter the sedimentation tank are definitely excluded and are immediately disposed of. The fine solids which do enter the tank are reliably removed therefrom and also promptly disposed of. A greatly lessened total of organic matter (suspended and dissolved) is presented in the tank for bacterial consumption and oxidation, with consequent improvement of the tank effluent. Still another advantage resides in the lessened quantity and the uniformity of the solids which settle in the tank; and, in the ease with which such solids may be moved along the bottom of the tank toward the point of sludge discharge.

Hereunder, the movement of the sludge solids is accomplished by means of a gentle underwater current organized and directed along the tank bottom in the direction of the sludge discharge opening. That under-water current is created by a number of small and gentle jets of water, preferably effluent from the tank. The nozzles employed are stationary. No moving parts or mechanisms are required within the tank and both installation and operating costs are thus brought within reason.

The foregoing and other matters comprehended by the invention will be readily understood upon reference to the accompanying drawing, in which: Fig. 1 is a diagrammatic vertical section of a sewage sedimentation tank and appurtenances embodying the invention; Fig. 2 is a plan view thereof; Fig. 3 is a vertical cross section on the line 3—3 of Fig. 2; Fig. 4 illustrates a tank of modified cross section; Fig. 5 is a detail illustrating the movable closure employed at the outfall end of the tank when it is desired to lift and skim scum from the tank; Fig. 6 is an enlarged fragmentary cross section of the lower part of the tank detailing the sludge propelling means, and, Fig. 7 is a vertical section taken from Fig. 6.

The elongated tank 2, here illustrated, may be made in any suitable way and of any suitable material. By preference and as here shown, it is an all metal structure of the trough-like cross section illustrated in Fig. 5. It may be of any desired length, depending upon the period of detention decided upon. Obviously, the size of the tank and the length of the detention period determines the volume of sewage that may pass through the tank in a given time.

The sewage enters the tank through a swift motion channel 3, which usually will contain a grit chamber 4 and a coarse bar screen 5.

The sewage leaves the tank over a weir 6, at the opposite end thereof, and the height of which weir governs the working level, L, of the sewage in the tank. The part 6a is the effluent duct. The water is presumed to move very slowly from end to end of the tank.

The swift motion channel 3 is of much smaller cross section than the sedimentation tank 2, it being desirable to prevent the settlement of organic matters in that channel. But the channel 3 contains mechanical means adapted to intercept and remove in greater part all sizable or palpable particles which are carried in suspension by the swift current, the purpose insofar as possible being to exclude such matters from the sedimentation tank.

The mechanical means provided to this end comprise the fine screen 7, which is arranged cross-wise of the swift motion channel 3, and by preference that screen is of the rotary, self-cleaning type, made after the design and manner set forth in my companion application S. N. 235,627 filed October 18, 1938.

As shown, means are provided for slowly rotating the cylindrical screen 7, and sewage matters which lodge upon the upstream side of the screen are thereby lifted above the surface of the liquid and after a draining period are delivered to a trough or duct 8, through which they are immediately conducted to a combustion furnace 9. The screen operation is continuous. The operation of the furnace may be either continuous or intermittent, as proves most convenient.

The parts marked 10 and 11 represent a blower system terminating in a nozzle or nozzles within the rotary screen and by which the mat of material on the screen is blown outward into the trough 8.

The water reaches the rotary screen over the top of the cross weir 12 and having entered the screen, falls through the bottom thereof. This last occurs after the burden of particles has been blown from the screen and the falling water effectively cleans each part of the rotary screen before it is presented to the incoming sewage.

A definite and beneficial aeration of the sewage occurs during its fall into and through the described screen.

By preference, the top of the cross weir 12 is formed by a flexible strip 13, which the moving water presses against the rotary screen 7. The purpose in elevating the strip 13 above the bottom of the channel 3 is to there save space for the retention of small stones and like heavy matters which might pass the bar screen 5.

Obviously, greases, oils and organic matters which are in solution in the water and colloidal solids too fine for interception by the screen all pass through the screen with a minor residue of fine palpable solids and remain to be disposed of in the sedimentation tank.

Those solids which are heavy enough to settle in the water, gravitate to the bottom of the tank and preferably are continuously discharged therefrom, as hereinafter described.

Soapy matters, greases and oil rise to the surface, L, and are removed by means such as hereinafter described.

Organic matters which remain long in suspension in the slowly moving water are in a large measure consumed by accompanying animal and vegetable organisms; and, the sewage leaves the tank, through the outfall 6 in much improved condition.

The abundant living organisms of sewage chiefly adhere to the sewage particles and it is important to note that the number of both is here reduced by the action of the screen 7 and the furnace 9.

Of next importance is the fact that the total of organic matters here entering the tank is greatly reduced, as compared with former practices. Therefore, less work remains to be done by bacteria in the tank and the character of the final effluent is markedly elevated. In the manner explained, advantage is taken of the rapidity with which bacteria multiply, particularly those of the aerobic type, regarded as beneficial. Propagation continues so long as consumable matters remain in the water. Generally speaking, there is no want of bacteria, for the period of detention is not unduly protracted.

Theoretically, it might be possible to protract detention to the point of destroying all organic, putrefiable matters and even to the point of extinguishing bacteria by starvation, but practically it is sufficient if the tank effluent imposes upon the diluting water only a reasonably limited oxygen demand.

The parts marked 14 and 15 are scum skimming cross troughs which are incorporated with baffle plates 14' and 15', respectively, the latter extending some distance below the level L. One or both skimmers may be used. Each thereof is a fixed trough that presents an edge S, which is slightly higher than the upper edge of the outfall weir 6. When scums are to be skimmed, the height of the weir 6 is operatively increased, interrupting or reducing the outfall of liquid. In consequence, the level L rises slightly and the scum drains into the cross trough; and thence into an oil and water separator 16, through pipes 17 and 18. Floatables are retained in the separator 16 while excess water is discharged through a pipe 19, usually connected with the effluent duct 6a. The oils and greases are taken from the separator 16 and as a rule are employed as added fuel in the screenings furnace 9.

In practice the conversion of the weir 6 into a dam is performed by a swingable gate or closure 20, by which the flow over the weir 6 may be limited or stopped. Preferable details are shown in Fig. 5 where the closure is disclosed as a swingable flap or gate adapted to close against the outfall trough 6b and operated and held by a loosely pivoted weight arm 21.

The skimming operation need not be continuous. Scum may be allowed to collect upon the surface L without detriment to the tank effluent. Occasional skimming is adequate; and, it is desirable to limit the quantity of water discharged into the separator 16 through the cross trough or troughs. Hence the manually operated skimming arrangements here presented.

Clearly, both skimmers are well in advance of the outfall 6 and no floatables are allowed to reach that point.

It remains to show how the solids which settle in the bottom of the tank are discharged therefrom and returned to the screen 7, as before described. For that purpose I provide, preferably in the lower part of the tank, a long water pipe 22, centrally positioned over the longitudinally extended bottom surface which is to be cleared. That pipe is equipped with spaced jets or nozzles 23, best shown in Figs. 6 and 7, and all directed downward and toward a sludge discharge opening 24, provided at the end of the tank. Water at slight pressure is supplied to the end 22' of the pipe 22 and escaping through the many nozzles 23, plays downward and forward against the bottom of the tank, thereby creating an under-water current within the body of liquid contained by the tank, which slight movement quietly sweeps the precipitated solids toward the discharge opening 24, there to be discharged through the sludge pipe 25 and thence into the influent channel 3, as will be explained.

By preference, water is supplied to the sludge propeller pipe 22 by means of a small pump 26, and is water which is taken from the effluent end of the tank, as through pipe 27. A regulating valve 28 is provided in the line so that the flow of water from the nozzles 23 may be controlled at will.

The arrangement of the nozzles with respect to the pipe 22 is peculiar, definite precaution being taken to prevent the clogging of the nozzles, which individually are of small capacity. To that end each nozzle 23 opens from the upper part of the pipe 22. Thereby the lower part of the pipe 22 is preserved as a reservoir for the collection of pipe scale and other solids which might clog the small nozzles 23, such solids settling in the bottom of the pipe 22.

By preference, one end of the pipe 22 is supported directly in the outfall end of the tank. The other end of the pipe 22 is supported by a riser 29, terminating in a goose-neck 30 at the top, the latter containing a valve 31. That valve is normally closed but occasionally should be opened. When the valve 31 is thus opened, the pressure of water in the pipe 22 furnishes a flow of water through the pipe 29 and back into the tank 2. By this simple means the pipe 22 may be blown out or cleared as frequently as may be found necessary.

Obviously, by means such as are here described, sludge particles may be moved along the bottom of the tank in either direction, but it is most convenient to move them against the main current in the tank, for hereunder the sludge solids are delivered or returned directly to the influent channel 3. Furthermore, through carelessness or intent, the vigor of the jets from the nozzles 23 may be sufficient to lift the sludge particles from the bottom of the tank and in such cases it is desirable to direct those particles toward the influent end of the tank, to re-settle therein.

The sludge pipe 25 passes upward and opens into the channel 3. It includes a small pump 32, which serves to elevate the sludge to a point above the tank level L, as obviously required.

For the reasons explained, the total of sludge conducted by the sludge discharge pipe 25 need not be large, but it is to be observed that no close limitation is imposed thereon, for the sludge water upon entering the influent channel 3 immediately joins the main stream and passes through the rotary screen 7. Coincidently, the sludge particles are caught and retained upon the screen and are thereby delivered into the trough 8 with the other screenings, thence to be disposed of in the furnace 9.

The part marked 33 is a hanger rod, several of which may be employed to support the pipe 22.

Attention is directed to Fig. 4, here employed to illustrate the fact that a plurality of sludge propeller pipes 22a may be employed in a flat bottomed sedimentation tank 2a. The fact that the screen 7 presents ample capacity for the separation of the sludge water and solids admits of the return of much sludge and therefore no objection may be urged against the multiplication of the propeller jets in the bottom of the tank.

I claim:

1. An elongated gravity sedimentation tank having an inlet for sewage at one end and a sludge discharge opening at the other end, in combination with a plurality of water nozzles positioned in the lower part of said tank in spaced relation longitudinally of the tank and directed toward said sludge discharge opening and means for supplying pressure water to said nozzles to move sludge settled in the lower part of said tank toward said sludge discharge opening.

2. An elongated gravity sedimentation tank having at one end a sludge discharge opening, said tank having influent and outfall openings at opposite ends thereof and means including nozzles positioned in the lower part of said tank in spaced relation longitudinally of the tank adapted to take effluent sewage from the outfall end of said tank and direct the same along the bottom of the tank in the direction of said discharge opening to move sludge settled in the lower part of said tank toward said sludge discharge opening.

3. The herein described sludge propeller pipe, in combination with a plurality of nozzles fixed in the bottom of said pipe and opening from within said pipe above the bottom thereof, thereby forming the lower part of the pipe into a reservoir for loose solids and means which permit the blowing of such solids from the pipe.

4. Apparatus for the treatment of sewage comprising an elongated sedimentation tank provided at one end with a liquid discharge opening spaced above its bottom and at its opposite end with a sludge discharge adjacent its bottom, a conduit of less cross-section than the tank arranged for the introduction of sewage into the tank at the end opposite to the liquid discharge opening, the point of entry of said conduit into the tank being so arranged with respect to the opening for the discharge of liquid that a slow flow through the tank will occur, and hydraulic means for the maintenance of a counterflow adjacent the bottom of the tank toward the sludge discharge opening.

5. Apparatus for the treatment of sewage comprising an elongated sedimentation tank provided at one end with a liquid discharge opening spaced above its bottom and at its opposite end with a sludge discharge opening adjacent its bottom, a conduit of less cross-section than the tank arranged for the introduction of sewage into the tank at the end opposite to the liquid discharge opening, the point of entry of said conduit into the tank being so arranged with respect to the opening for the discharge of liquid that a slow flow through the tank will occur, jets arranged within the tank adjacent its bottom and arranged to discharge in a direction opposite to that of flow therethrough and means for discharging liquid discharged from the tank through said jets under sufficient pressure to establish a counterflow adjacent the bottom of said tank toward the sludge discharge opening.

6. That improvement in the sedimentary treatment of sewage which involves the maintenance of a slowly moving stream of sewage and which is characterized by the separate maintenance of a sludge conveying current of liquid at the bottom of said stream, the said current having a direction and a force opposite to that of said slowly moving stream and such as to effect movement of sludge along the bottom of the tank.

7. That improvement in the sedimentary treatment of sewage which comprises the maintenance of a slowly moving stream of sewage and the separate maintenance of a sludge conveying current of liquid of opposite direction at the bottom of said stream, the said current having a direction and a force opposite to that of said slowly moving stream and such as to effect movement of sludge along the bottom of the tank.

CHARLES GILBERT HAWLEY.